United States Patent [19]

Ozawa

[11] Patent Number: 4,876,585
[45] Date of Patent: * Oct. 24, 1989

[54] CONTACT TYPE IMAGE SENSOR WITH SEPARATE CHARGE TRANSFER DEVICE

[75] Inventor: Takashi Ozawa, Kanagawa, Japan

[73] Assignee: Fuji Xerox Co., Ltd., Tokyo, Japan

[*] Notice: The portion of the term of this patent subsequent to Oct. 22, 2002 has been disclaimed.

[21] Appl. No.: 81,531

[22] Filed: Aug. 3, 1987

Related U.S. Application Data

[63] Continuation of Ser. No. 504,394, Jun. 15, 1983.

[30] Foreign Application Priority Data

Jun. 18, 1982 [JP] Japan .................................. 57-104800

[51] Int. Cl.[4] .................. H01L 29/78; H01L 27/14; H01L 31/00; H01J 40/14
[52] U.S. Cl. ....................................... 357/24; 357/15; 357/30; 250/578
[58] Field of Search .................. 357/24 LR, 30, 15; 250/578

[56] References Cited

U.S. PATENT DOCUMENTS

| | | | |
|---|---|---|---|
| 4,093,872 | 6/1978 | Hartman et al. | 357/30 |
| 4,236,829 | 12/1980 | Chikamura et al. | 357/24 LR |
| 4,271,420 | 6/1981 | Chikamura et al. | 357/30 |
| 4,323,912 | 4/1982 | Koike et al. | 357/24 LR |
| 4,413,188 | 11/1983 | Ozawa et al. | 250/578 |
| 4,462,047 | 7/1984 | Fujimoto et al. | 357/24 LR |
| 4,549,088 | 10/1985 | Ozawa | 250/578 |
| 4,811,069 | 3/1989 | Kakinuma et al. | 357/30 |

OTHER PUBLICATIONS

Terui et al., "A Solid-State Color Image Sensor Using ZnSe-Zn$_{1-x}$Cd$_x$Te Heterojunction Thin-Film Photoconductor" IEEE Int. Solid-State Circuits Conf. (2/80), DIG. Tech. Papers pp. 34-35.

Primary Examiner—Gene M. Munson

[57] ABSTRACT

An image sensor includes a charge transfer device such as CCD and BBD which is utilized as a switching element for reading signals.

In the case where the charge transfer device is formed on a P-type semiconductor substrate, electric potential of the P-type semiconductor substrate is set to be equal to or less than that of the bias voltage (which is negative value) applied to the photoelectric conversion elements. On the other hand, if the charge transfer device is formed on an N-type semiconductor substrate, electric potential of the N-type semiconductor substrate is set to be equal to or higher than that of the bias voltage (which is positive value) applied to the photoelelctric conversion elements.

8 Claims, 3 Drawing Sheets

CONTACT TYPE IMAGE SENSOR WITH SEPARATE CHARGE TRANSFER DEVICE

This is a continuation of copending application Ser. No. 504,394 filed on June 25, 1983, now abandoned.

BACKGROUND OF THE INVENTION

The present invention relates to an image sensor for use in facsimile systems and the like.

As an image sensor for use in facsimile systems and the like, an IC type image sensor has been known in which a MOS photodiode array, a CCD image sensor or the like is employed.

In addition to such IC type image sensor, there has been proposed a so-called contact type image sensor in which a plurality of photoelectric conversion elements are formed on an insulator substrate and a circuit for scanning these elements is provided either on the same substrate or outside of the substrate. In such contact type image sensor, the width of the array of the photoelectric conversion elements is same as that of a document to be read, and therefore the image sensor of this type can read the document with one picture element to one photoelectric conversion element correspondence by the use of an optical system composed of an optical fiber array, lens array or the like.

FIG. 1(a) is a circuit diagram of the aforesaid contact type image sensor, FIG. 1(b) is a fragmentary plan view showing the contact type image sensor of FIG. 1(a), and FIG. 1(c) is a sectional view taken along line A—A of FIG. 1(b). In the drawings a photoelectric conversion element 1 is composed of a photoelectric film. This element is equivalently represented by a photodiode PD and a condenser CD as shown in FIG. 1(a). A switching circuit 7 consists of MOS transistors 5 and a shift register 6. These MOS transistors are for switching the photoelectric conversion elements 1, and the shift register 6 is for scanning the MOS transistors 5. Furthermore, reference numeral 2 designates electrodes, 8 signal wire, 9 a load resistor, and 10 a power source for biasing respectively.

Referring to FIGS. 1(b) and (c), the photoelectric conversion element 1 is constructed in such a manner that a photoconductive film 3 is laminated on the separated electrodes 2 provided on a substrate 11, and an electrode 4 is further superposed thereon, in other words, the photoconductive film 3 is sandwiched between the separated electrodes 2 and the electrode 4.

The switching circuit 7 is constructed by integrating the MOS transistors 5 and the shift register 6 onto a semiconductor substrate, and the switching circuit 7 thus constructed is placed on the substrate 11 and connected to the photoelectric conversion elements 1 by lead wire in wire bonding or the like manner.

In such construction as mentioned above, when image on a document to be read is focused on the photoelectric conversion elements 1 by means of an optical system (not shown), photoelectric current corresponding to the light intensity is generated in the photodiodes PD, so that electric potentials of the electrodes 2 vary in accordance with the photoelectric current. These electric potentials are transmitted to the signal wire 8 through the MOS transistors which is in ON state, and as the result, they are taken out by the aid of the resistor 9 as picture signals. However, in such contact type image sensor the switching circuit 7 is formed with a substantially same width with that of the array of the photoelectric conversion elements 1. As a consequence, length of the signal wire 8 unfavorably becomes longer so that various noises are induced on the signal wire 8. Such noises principally include noise derived from a clock pulse for driving the shift register 6, spike noise generated at the time when a MOS transistor 5 is turned ON and OFF. These noises are a cause for deteriorating signal to noise ratio of the contact type image sensor and therefore serve as an obstacle to improvement of performance such as speeding up in reading speed of the image sensor.

SUMMARY OF THE INVENTION

The present invention has been made to eliminate disadvantages of the above-mentioned conventional contact type image sensor, and an object of the invention is to provide a contact type image sensor with improved signal to noise ratio.

According to the present invention, charge transfer devices such as CCD (charge coupled device), BBD (bucket brigade device) or the like are utilized as switching elements for reading signals.

According to the present invention, in the case where a charge transfer device formed on P-type semiconductor substrate (e.g. N channel CCD, N channel BBD) is employed, electric potential of the P-type semiconductor substrate is set to be equal to or less than that of the bias voltage (which is negative value) applied to the photoelectric conversion elements. On the other hand, if a charge transfer device formed on N-type semiconductor substrate (e.g. P channel CCD, P channel BBD) is employed, electric potential of the N-type semiconductor substrate is set to be equal to or higher than that of the bias voltage (which is positive value) applied to the photoelectric conversion elements.

DETAILED DESCRIPTION OF THE INVENTION

The present invention will be described in detail hereinbelow in conjunction with the preferred embodiments thereof.

Figure 1A:
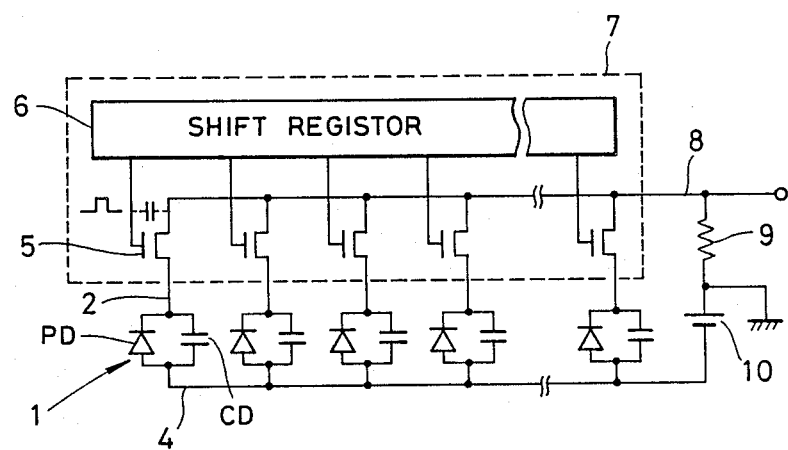
FIG. 1(a) is a circuit diagram illustrating an equivalent circuit of a conventional contact type image sensor.
Figure 1B:
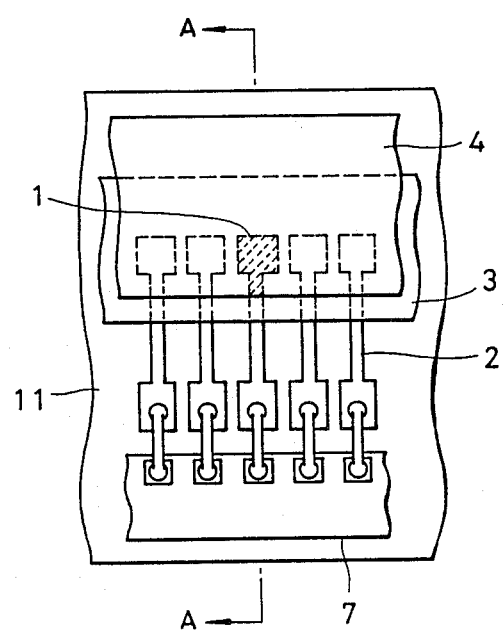
FIG. 1(b) is a plan view showing the conventional image sensor of FIG. 1(a)
Figure 1C:
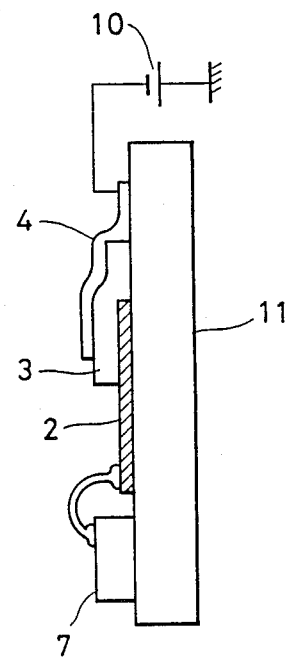
FIG. 1(c) is a sectional view taken along line A—A of FIG. 1(b)
Figure 2:
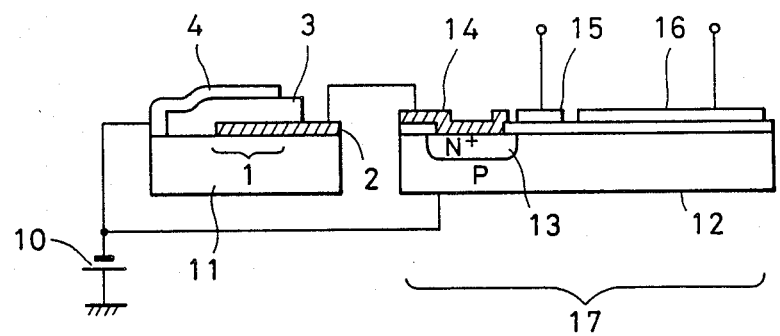
FIG. 2(a) is a schematic view showing an embodiment of the contact type image sensor according to the present invention.
FIG. 2(b) is a plan view of the image sensor of FIG. 2(a)
Figure 2:
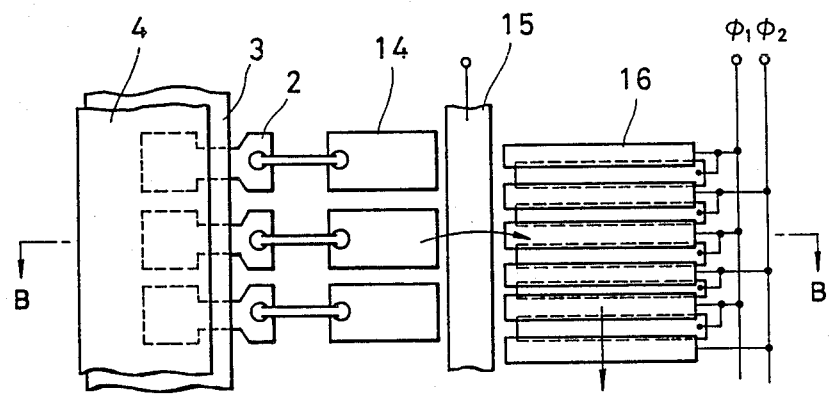

FIG. 2(a) is a schematic view and FIG. 2(b) is a plan view showing an embodiment of the image sensor according to the present invention wherein parts having similar functions to those of FIG. 1 are shown by the same reference numerals for convenience' sake of explanation. Namely, reference numeral 11 designates a substrate, 2 separated electrodes, 3 a photoconductive film, and 4 a transparent conductive film, respectively. The substrate 11, the separated electrode 2, the photoconductive film 3, and the transparent conductive thin film 4 are made of glass, chromium, amorphous silicon, and ITO (indium-tin oxide), respectively. Each photoelectric conversion element 1 is formed with a part where the transparent conductive film 4 overlaps the separated electrode 2. As may be seen in FIG. 2(a) the transparent conductive film 4, made of ITO (indium-tin-oxide), and the photoconductive film 3, made of amorphous silicon, are in direct contact forming a Schottky contact. The photoelectric conversion element 1 is connected to a charge transfer device 17 such as CCD, BBD or the like. In the charge transfer device 17 an input diode 14 for injecting signal charge is formed by providing an N-type impurity diffusion layer 13 on a P-type semiconductor substrate 12. Reference numeral 15 designates a MOS type transport gate for transporting signal charge to the charge transfer device 17, and 16 transfer electrodes, for transferring the signal charge respectively.

The photoelectric conversion element 1 is biased in such a way that the transparent conductive film 4 has negative voltage to reduce dark current of the element. In this case, the P-type semiconductor substrate 12 is connected with negative voltage of a power source 10, enabling the signal charge to be correctly read out.

Figure 3:
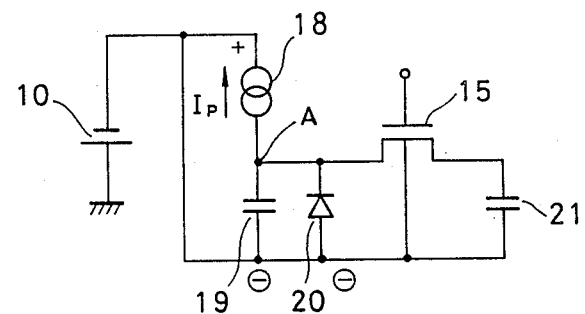
FIG. 3 is an equivalent circuit for explaining operation of the image sensor according to the embodiment of FIGS. 2(a) and (b)

FIG. 3 is an equivalent circuit illustrating contact type image sensor of the above construction, and operation of the present embodiment will be described hereinbelow by referring to the equivalent circuit. In FIG. 3, a constant-current source 18 corresponds to the photoelectric conversion element 1, and a capacitor 19 and a diode 20 are formed by junction between the P-type semiconductor substrate 12 and the N-type impurity diffusion layer 13 as shown in FIG. 2(a). A capacitor 21 is formed under the transferring electrode 16 and functions as a capacity for potential well for CCD as an accumulation capacity for BBD.

The transporting gate 15 is made to be the same electric potential with that of the substrate 12 and potential at point A in initial state with the transporting gate 15 being closed is assumed to be in ground level. Under such condition when the photoelectric conversion element 1 is subjected to light irradiation, photoelectric current IP flows in the constant-current source 18 in the direction of an arrow and as a result, signal charge is stored in the capacitor 19. With such storage, the potential at point A lowers in negative direction. However, since the anode of the diode 20 is connected with negative voltage of the power source 10, the diode 20 maintains a state of reverse bias so that all the signal charge can be stored in the capacitor 19. Such storage of charge with respect to the capacitor 19 continues until the potential at point A becomes equal to that of a negative terminal of the power source 10. As a result, saturation level of the signal charge can be increased so that it becomes possible to widen dynamic range of the output signal.

Thereafter, the transferring gate 15 is turned on to transport the signal charge stored in the capacitor 19 to the capacitor 21. The capacitor 21 is the one formed under electrodes of a transfer channel of the CCD or the BBD.

The charge transported to the transfer channel is transferred along, for example, a direction of the arrow by means of a pulse $\phi_1$ or $\phi_2$ (see FIG. 2(b)) which is alternatively applied to the transfer channel.

In accordance with such construction as mentioned above, leakage charge due to ON-OFF operation of the transporting gate 15 and derived therefrom does not become a signal, but is integrated in the capacitor 21 so that no spike noise is generated due to ON-OFF operation of the gate 15.

Taking out the transferred charge is generally made in the form of voltage outputted by means of an amplifier (not shown) provided on the semiconductor substrate as in the case of the CCD or the BBD.

According to the image sensor of the present invention as described above, spike noise or clock noise due to switching is not generated unlike the case of taking out the charge with MOS transistor so that it is possible to obtain signal of a favorable SN ratio.

Figure 4:
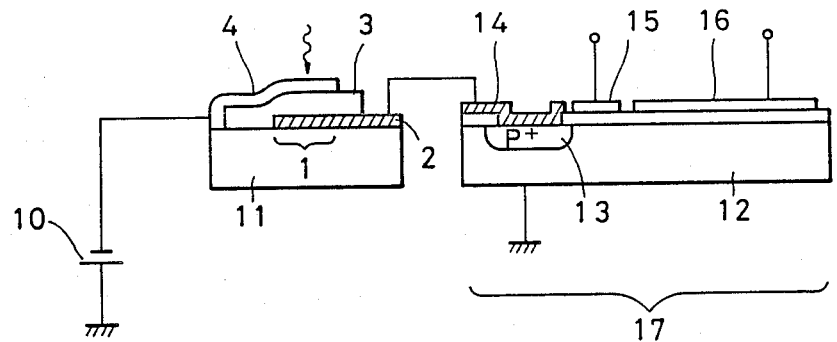
FIG. 4 is a schematic view showing another embodiment of the image sensor according to the present invention.
Figure 5:
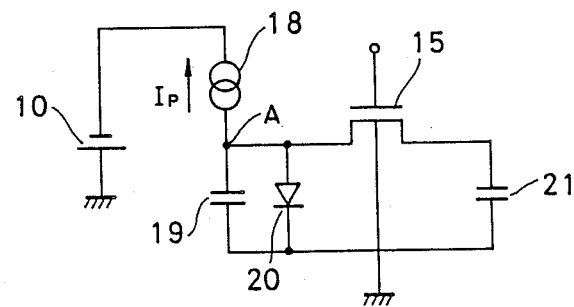
FIG. 5 is an equivalent circuit for explaining operation of the image sensor according to the embodiment of FIG. 4.

FIG. 4 is a schematic view illustrating another embodiment of the present invention in the case where the photoelectric conversion element 1 is made of amorphous silicon and is driven by means of a charge transfer device formed on an N-type semiconductor substrate such as a P channel CCD and P channel BBD. FIG. 5 is an equivalent circuit for explaining operation of the embodiment in FIG. 4.

In this embodiment, the power source 10 for biasing the photoelectric conversion element 1 is connected in such that the transparent conductive film 4 becomes negative voltage, whilst the semiconductor substrate 12 in the charge transfer device 17 is connected to positive electric potential of the power source 10, i.e., the ground.

In the construction as mentioned above, when the photoelectric conversion element 1 is subjected to light irradiation with the transporting gate 15 being closed by making the transporting gate 15 to be the same electric potential with that of the semiconductor substrate 12, photoelectric current IP flows through the constant-current regulated power source 18 in the direction of an arrow as shown in FIG. 5. As a result, signal charge is stored in the capacitor 19. With such storage, the potential at point A lowers in negative direction. However, since the cathode of the diode 20 is grounded, the diode 20 maintains a state of reverse bias so that signal charge can be stored in the capacitor 19 as in the above case.

Furthermore, a similar construction can be obtained when Se-As-Te, Cr-Au, and ITO are used for the photoelectric film 3, the divided electrode 2, and the transparent conductive film 4, respectively. In this case, however, by applying bias of the photoelectric conversion element 1 in such a way that the transparent conductive film 4 becomes positive, dark current can be reduced. More specifically, bias voltage of the semiconductor substrate 12 of the charge transfer device 17 in this case is adjusted to either the same potential with negative potential of the bias in the case where the charge transfer device 17 is of N channel type, or the same potential with positive potential of the bias in the case where the charge transfer device 17 is of P channel type, whereby all the signal charge can be stored.

As the photoconductive film 3, Se, Se-As, Se-Te, or CdS, Cd-Se, or Zn-Se, Zn-Cd-Te, or composite films thereof, besides polycrystalline silicon or the like can be utilized other than those described above, and a similar photoelectric conductive film can be constructed.

Although the aforesaid embodiments have such a construction that the transparent conductive film 4 is formed as the uppermost layer and light enters the layer from the above, a construction wherein a transparent electrode is formed on the substrate and a transparent substrate is used and light enters the transparent substrate is also acceptable. A construction in which the transparent electrode is separated may also be practiced.

What is claimed is:

1. A contact type image sensor comprising:
    a first substrate;
    a plurality of first electrodes arranged in line and being disposed on said first substrate;
    an amorphous silicon layer disposed on said first electrodes;
    a second electrode disposed on said amorphous silicon layer, said second electrode working as common electrode, said second electrode and said amorphous silicon forming a Schottky contact therebetween;
    first biasing means for applying a negative bias voltage to said second electrode;
    a second substrate provided separately and spaced apart from said first substrate, said second substrate being made of P type semiconductor;
    a charge transfer device formed on said second substrate, said charge transfer device including a plurality of input diodes each for storing electric charge whose amount respectively corresponding to output of associated one of said first electrodes and adapted to transfer said electric charge stored in said output diodes;
    means for connecting each of said input diodes to said associated one of the first electrodes;
    second biasing means for biasing said second substrate at a voltage equal to or lower than said negative vias voltage applied by said first biasing means.

2. A contact type image sensor as set forth in claim 1 wherein said second electrode is made of transparent electrically conductive film.

3. A contact type image sensor as set forth in claim 1 wherein said first electrodes are made of transparent electrically conductive film and said first substrate is made of a transparent insulating substance.

4. A contact type image sensor as set forth in claim 1 wherein said connecting means comprises wire bonding.

5. A contact type image sensor as set forth in claim 1 wherein said charge transfer device comprises a CCD.

6. A contact type image sensor as set forth in claim 1 wherein said charge transfer device comprises a BBD.

7. A contact type image sensor comprising:
    a first substrate;
    a plurality of first electrodes arranged on line and being disposed on said first substrate;
    an amorphous silicon layer disposed on said first electrodes;
    a second electrode disposed on said amorphous silicon layer, said second electrode working as common electrode, said second electrode and said amorphous silicon forming a Schottky contact therebetween;
    first biasing means for applying a negative bias voltage to said second electrode;
    a second substrate provided separately and spaced apart from said first substrate, said second substrate being made of N type semiconductor;
    a charge transfer device formed on said second substrate, said charge transfer device including a plurality of input diodes each for storing electric charge whose amount respectively corresponding to output of associated one of said first electrodes and adapted to transfer said electric charge stored in said input diodes;
    means for connecting each of said input diodes to said associated one of the first electrodes;
    second biasing means for biasing said second substrate at a voltage equal to or higher than the ground voltage.

8. A contact type image sensor as set forth in claim 7 wherein said second biasing means applies a bias voltage of ground potential.

* * * * *